United States Patent
Wada et al.

(10) Patent No.: US 7,177,543 B2
(45) Date of Patent: Feb. 13, 2007

(54) METHOD FOR ROUTING OPTICAL PACKETS USING MULTIPLE WAVELENGTH LABELS, OPTICAL PACKET ROUTER USING MULTIPLE WAVELENGTH LABELS, AND OPTICAL PACKET NETWORK THAT USES MULTIPLE WAVELENGTH LABELS

(75) Inventors: Naoya Wada, Koganei (JP); Hiroaki Harai, Koganei (JP); Wataru Chujo, Koganei (JP); Fumito Kubota, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 11/095,514

(22) Filed: Apr. 1, 2005

(65) Prior Publication Data

US 2005/0180750 A1    Aug. 18, 2005

Related U.S. Application Data

(63) Continuation of application No. 09/820,647, filed on Mar. 30, 2001, now Pat. No. 6,876,817.

(30) Foreign Application Priority Data

Sep. 6, 2000    (JP) .............................. 2000-270841

(51) Int. Cl.
H04J 14/00    (2006.01)

(52) U.S. Cl. .......................... 398/49; 398/51; 398/54; 398/79; 398/84

(58) Field of Classification Search .................. 398/79, 398/84, 51, 49, 54, 57
See application file for complete search history.

(56) References Cited

U.S. PATENT DOCUMENTS 5,541,756 A    7/1996  Chang-Hasnain et al.
6,580,537 B1 *  6/2003  Chang et al. .................. 398/79

FOREIGN PATENT DOCUMENTS

| FR | 2 709 839    | 3/1995 |
| JP | 3038378      | 3/2000 |
| JP | 2000-209186  | 7/2000 |
| WO | WO 00/04668  | 1/2000 |

OTHER PUBLICATIONS

Ken-ichi Kitayama, et al., IEEE Photonics Technology Letters, vol. 11, No. 12, pp. 1689-1691, "Photonic IP Routing", Dec. 1999.

* cited by examiner

*Primary Examiner*—David C. Payne
(74) *Attorney, Agent, or Firm*—Oblon, Spivak, McClelland, Maier & Neustadt, P.C.

(57) ABSTRACT

A method for routing optical packets using multiple wavelength labels includes converting optical packet address signals to a plurality of optical pulses having different time-deviated wavelengths by executing a first operation to impart a wavelength dependent delay time with respect to a plurality of optical pulses having different wavelengths at a same time axis position. When the optical pulses are transmitted along a predetermined optical path having dispersion the dispersion is compensated for by executing a second operation on the optical pulses corresponding to a reverse process of the operation to impart a wavelength dependent delay time. This second operation results in the generation of a plurality of optical pulses having different wavelengths at a given point on the time axis. The pulse signals thus generated are used to determine the packet transmission route.

2 Claims, 11 Drawing Sheets

FIG.10
(a) MULTIPLE WAVELENGTH LABEL (100ps/div)
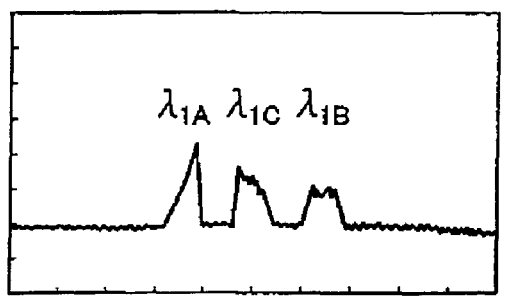
$\lambda_{1A}\ \lambda_{1C}\ \lambda_{1B}$
(b) PACKET (1ns/div)
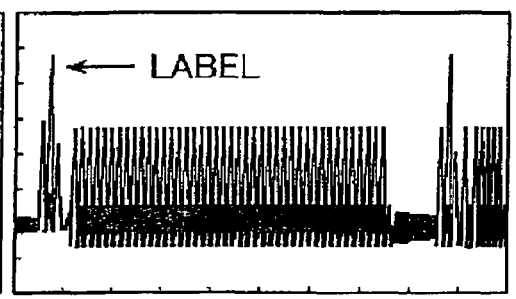
LABEL
(c) WHEN MATCHED (100ps/div)
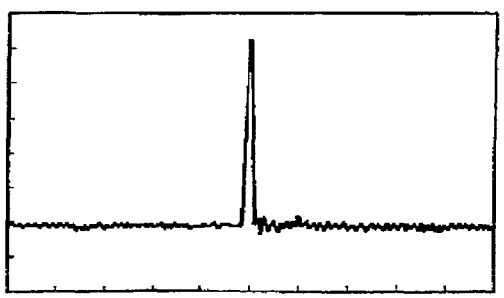
(d) WHEN UNMATCHED (100ps/div)
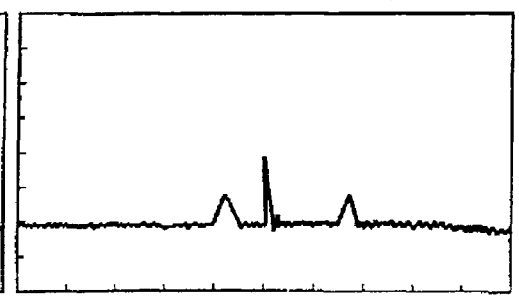
(e) (1ns/div)
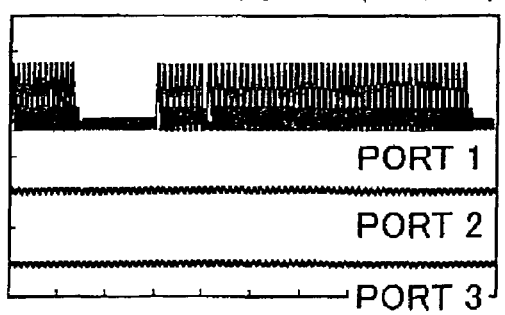
PORT 1
PORT 2
PORT 3
(f) (1ns/div)
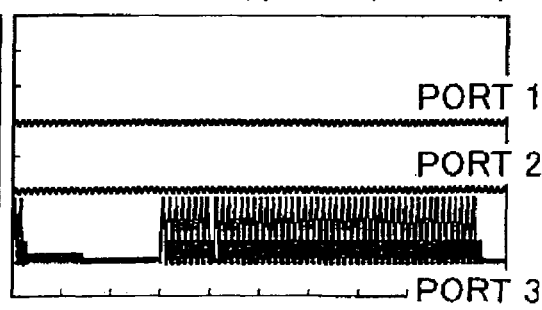
PORT 1
PORT 2
PORT 3

METHOD FOR ROUTING OPTICAL PACKETS USING MULTIPLE WAVELENGTH LABELS, OPTICAL PACKET ROUTER USING MULTIPLE WAVELENGTH LABELS, AND OPTICAL PACKET NETWORK THAT USES MULTIPLE WAVELENGTH LABELS

CROSS-REFERENCE TO RELATED APPLICATIONS

The present application is a continuation of U.S. application Ser. No. 09/820,647 filed on Mar. 30, 2001 now U.S. Pat. No. 6,876,817, and in turn claims priority to JP 2000-270841 filed on Sep. 6, 2000, the entire contents of each of which are hereby incorporated herein by reference.

BACKGROUND OF THE INVENTION

1. Field of the Invention

The present invention relates to optical communication by routing optical packets using multiple wavelength labels. More particularly, the present invention relates to a method for routing optical packets using multiple wavelength labels that is based on wavelength division multiplexing (WDM), to an optical packet router using multiple wavelength labels, and to an optical packet network that uses multiple wavelength labels.

2. Description of the Prior Art

In the area of optical packet communications using optical fibers, photonic networks have been proposed in which not only trunk line links, but even switching functions in network nodes connecting a plurality of trunk lines, are implemented in the optical domain. In such a network, when each of the optical packets passes through a network node, it can autonomously switch to a predetermined route based on address information carried by the packet. In this respect, there is a need for an optical packet routing system that optically labels each packet with the respective address, checks and identifies the labels in the optical domain and, based on the identification result, switches the output route of the packet.

In prior art photonic networks based on the WDM technology, many configurations and methods have been proposed in which the routing labels are comprised as single wavelength optical signals. To identify the packet labels, this technology uses simple wavelength identification devices such as arrayed waveguide gratings (AWG), which are limited with respect to the number of labels that can be identified. Specifically, when single wavelength labels are used, with the existing level of technology, most networks can only handle around 100 to 200 labels, and the upper limit for any network is around 1000.

For the processing involved, there has been proposed a label switching router employing a phase code processor that uses an optical code division multiplexing (OCDM) system (K. Kitayama and N. Wada, "Photonic IP Routing," IEEE Photon. Technol. Lett., vol. 11, no. 12, pp. 1689–1691, December 1999). In that system, the labels used are phase labels having a pattern comprised of a light phase, such as 0, π, for example, so that the labels are, for example, "000π", "00ππ", "0π0π," and so forth, which are processed by a phase code processor. An input signal constituting a phase label is split into a plurality of signals, each of which falls incident on an independent optical correlation processor. Each of these optical correlation processors is configured to match, i.e. identify, a corresponding independent phase label. This differs from the present invention in terms of label configuration method and label processor.

With respect to optical encoding using time spreading/wavelength hopping codes, Japanese Patent No. 3038378 discloses a method in which streams of optical pulses having different wavelengths on a bit-by-bit basis are used for encoding by setting different codes within a code sequence specified for each channel, with decoding of received signals being effected by matched filtering in the time domain. This disclosure differs from the present invention in that the disclosure does not pertain to routing.

As described above, with respect to prior art optical packet routing methods and apparatuses, and optical packet network configurations, with current technology, when single wavelength labels are used, most networks can only handle around 100 to 200 labels, and the upper limit for any network is around 1000 labels.

SUMMARY OF THE INVENTION

An object of the present invention is to provide a method for routing optical packets using multiple wavelength labels, an optical packet router using multiple wavelength labels and an optical packet network that uses multiple wavelength labels, that enable wavelength resources to be effectively utilized by using wavelength division multiplexing to route optical packets with multiple wavelength labels, thereby greatly increasing the number of routing labels that can be used in a network compared to the number of routing labels that can be used in a prior art photonic network.

In a first aspect, the present invention achieves the above object by providing a method for routing optical packets using multiple wavelength labels, the method comprising: converting optical packet address signals to a plurality of optical pulses having different time-deviated wavelengths by executing a first operation to impart a wavelength dependent delay time with respect to a plurality of optical pulses having different wavelengths at a same time axis position and, when the optical pulses are transmitted along a predetermined optical path having dispersion, compensating for the dispersion by executing a second operation on the optical pulses corresponding to a reverse process of the operation to impart a wavelength dependent delay time, the second operation resulting in generation of a plurality of optical pulses having different wavelengths at a same time axis position, and using signals of the pulses thus generated to determine a transmission route.

In another aspect, the invention provides a method for routing optical packets using multiple wavelength labels, in which a predetermined waveband used for one-bit address signals and a one-bit data signal waveband have identical bandwidths.

In another aspect, the invention provides a method as described in which the bandwidth allocated to data signals included in optical packets is wider than the bandwidth allocated to address signals.

In another aspect, the invention provides a method as described in which address signals and data signals are transmitted with a predetermined time differential.

In another aspect, the invention provides a method as described in which optical packet address signals include address information that is identified by wavelength information delimited by a predetermined waveband width and predetermined time differential information.

In another aspect, the invention provides a method as described in which optical packet address signals include first address information that is identified by wavelength information delimited by a first waveband width, and second address information that is identified by wavelength information delimited by a second waveband width and predetermined time differential information.

In another aspect, the invention provides a method as described in which, based on first address information, routing is performed by a first router that can switch optical paths according to wavelength differences and, based on second address information, routing is performed by a second router that can switch optical paths according to time differences.

In a second aspect, the invention provides an optical packet router using multiple wavelength labels, the router comprising: means for separating data signals and address signals identified by wavelength information delimited by a predetermined waveband width and predetermined time differential information included in optical packets; means for demodulating address information identified by the wavelength information delimited by a predetermined waveband width and predetermined time differential information from the address signals; means for switching an optical switch in accordance with demodulated address information; and selection means that uses the optical switch to select an optical route for the data signals.

In another aspect, the invention provides a router as described in which the demodulation means uses a multi-section fiber Bragg grating.

The invention also provides an optical packet router using multiple wavelength labels comprising: a pulse light source that includes multi-wavelength laser light; means for dividing pulse signals from the pulse light source into a plurality of light paths; a means for obtaining a first pulse signal using a means that interacts with a multi-section fiber Bragg grating following modulation of one divided pulse signal; a means for obtaining a second pulse signal comprising means for narrowing waveband width of other divided pulse signals and means for modulating the reduced-bandwidth pulse signals; means for adjusting a time differential between the first pulse signal and the second pulse signal; and means for guiding the first and second pulse signals thus adjusted to a same light path.

In a third aspect, the invention provides an optical packet communication network that uses multiple wavelength labels, the network including a plurality of routers that can switch optical paths in accordance with differences in combinations of multiple optical pulse wavelengths and time differentials included in address signals, with at least two of the routers being connected together.

In another aspect, the invention provides an optical packet communication network that uses multiple wavelength labels, the network including a first router that can switch optical paths in accordance with differences in wavelengths of multiple optical pulses included in address signals, and a second router that can switch optical paths in accordance with differences in combinations of multiple optical pulse wavelengths and time differentials included in address signals, with the second router being connected to the first router.

Further features of the invention, its nature and various advantages will be more apparent from the accompanying drawings and following detailed description of the invention.

BRIEF DESCRIPTION OF THE DRAWINGS

FIG. 10 shows signal waveforms of each part of a multiple wavelength label switching router, in which FIG. 10(a) shows the detected signal waveform of a multiple wavelength label generated by means of a multi-section fiber Bragg grating; FIG. 10(b) shows the detected signal waveform of the packet consisting of a header having a multiple wavelength label and a payload data; FIG. 10(c) shows the detected waveform of a signal signifying a label match output by a multiple wavelength label matching unit comprised of a multi-section fiber Bragg grating; FIG. 10(d) shows the detected waveform of a signal signifying a label non-match output by a multiple wavelength label matching unit comprised of a multi-section fiber Bragg grating; FIG. 10(e) shows the detected waveform of a signal output by a three-port switch signifying a port #1 multiple wavelength label; and FIG. 10(f) shows the detected waveform of a signal output by a three-port switch signing a port #3 multiple wavelength label.

DESCRIPTION OF THE PREFERRED EMBODIMENT

In the prior art packet communications, a packet signifies the temporal propagation of signal system sets. However, in the case of the present invention, a packet signifies the wavelength propagation, or both wavelength and temporal propagation, of signal system sets. The present invention relates to the handling of codes having structural elements in the form of a plurality of points in two-dimensional space that are propagated in terms of wavelength and temporal direction. In particular, the invention uses as optical labels optical signal system data that are propagated in terms of both wavelength and time-based direction. Using these optical labels as identifiers in optical domain packet switching makes it possible to effectively utilize wavelength resources by greatly increasing the number of labels that can be used within a single network. Details are explained in the following embodiments.

Figure 1:
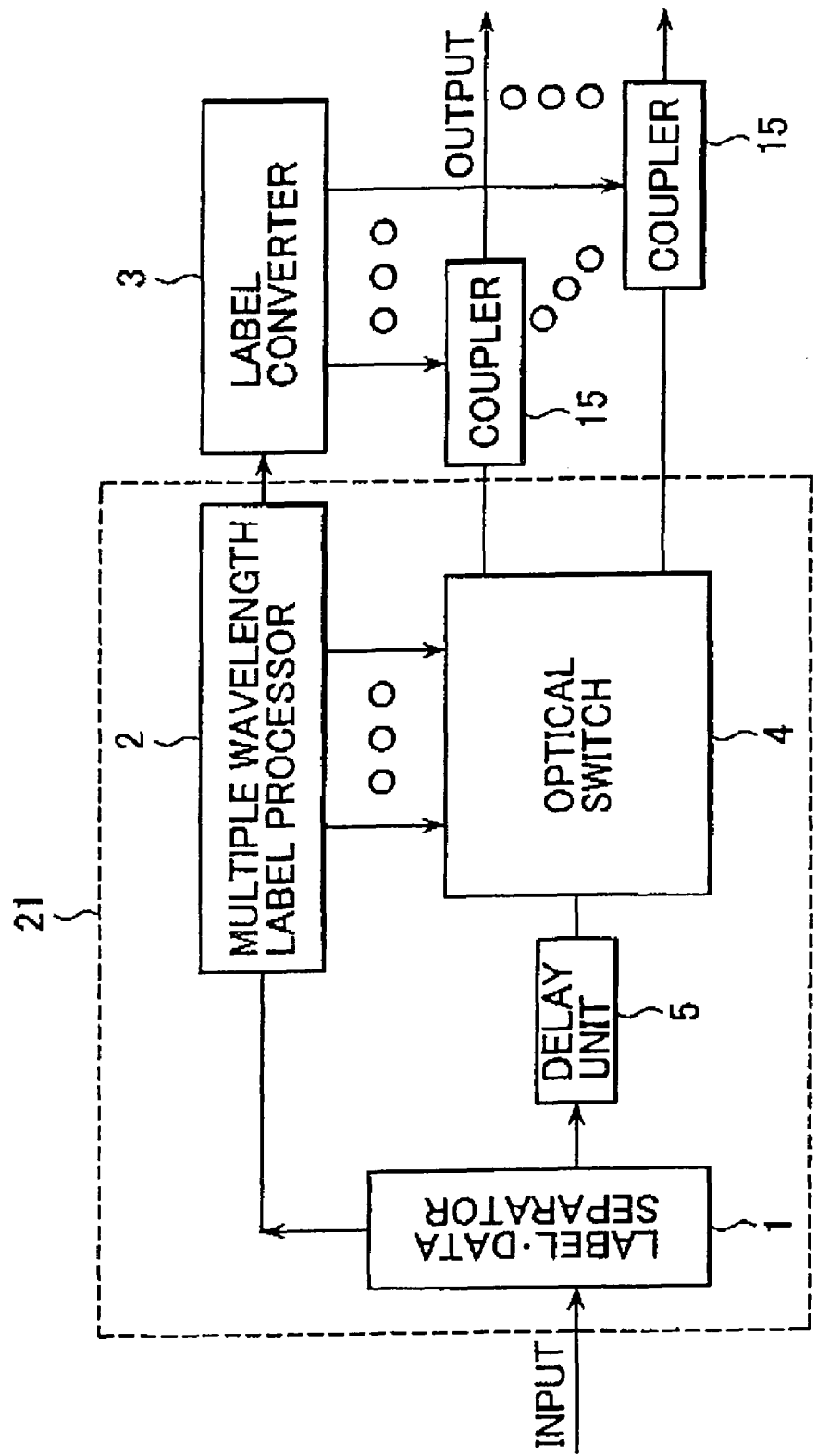
FIG. 1 is a drawing showing the configuration of a multiple wavelength label switching router system.

FIG. 1 shows the configuration of a multiple wavelength label switching router system. The router comprises a label/data separator 1, a multiple wavelength label processor 2, a label converter 3, an optical switch 4, an optical delay unit 5 and an optical coupler 15. Transmitted optical packets, each carrying multiple wavelength labels affixed to data as header information, are input to the router. These packets are separated into two by the label/data separator 1 and the respective parts sent to the label processor 2 and optical delay unit 5. In the label processor 2, the labels are not converted to electrical signals, but are read in their native optical signal form, resulting in the output of a switch control signal. The control signal is sent to the optical switch 4, where an optical wave detector converts it to a high-frequency signal that is applied to the optical switch 4. The optical delay unit 5 applies a time delay to data going to the optical switch 4, the time delay corresponding to the difference between that optical path and the optical path to the label processor 2. Following this, the optical switch 4 outputs a signal based on a control signal from the label processor 2. The optical coupler 15 combines this output with a new label output from the label converter 3, and outputs the result as an optical packet.

Figure 2:
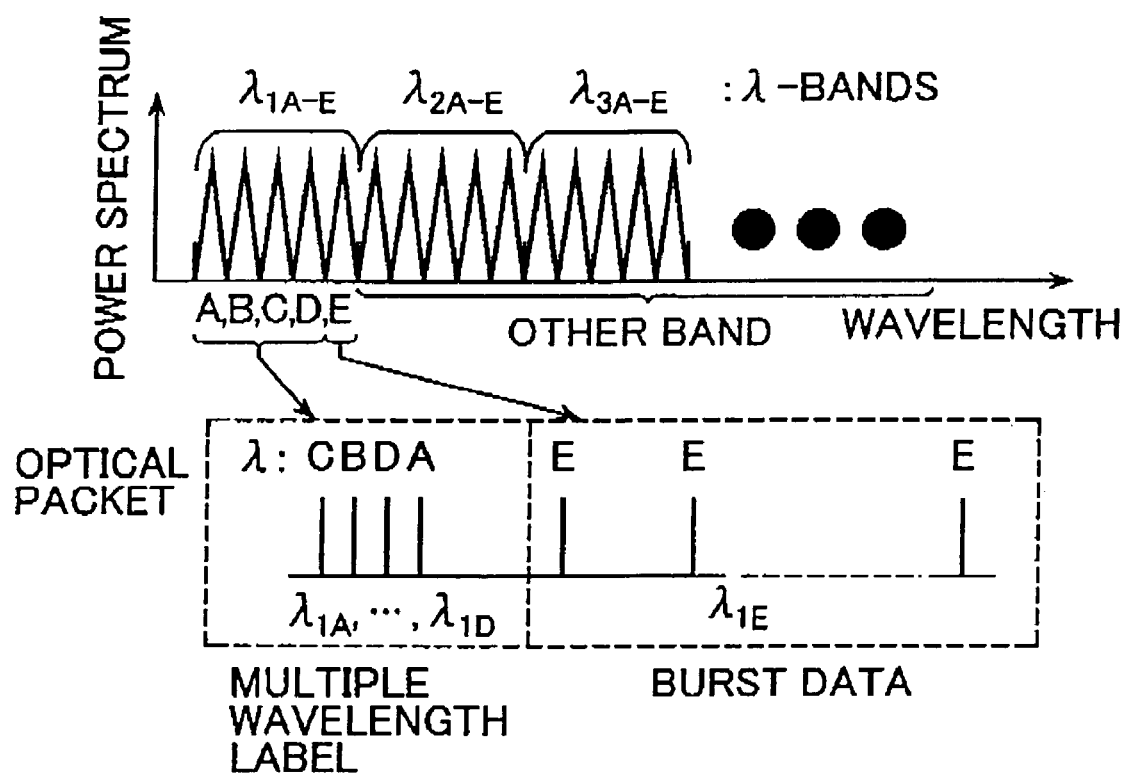
FIG. 2 shows an example of a first configuration of an optical packet having a multiple wavelength label.

FIG. 2 shows an example of a first configuration of an optical packet with a multiple wavelength label. These optical packets are divided into wavebands $\lambda 1, \lambda 2, \ldots \lambda n$. In the following, this is referred to as a large-band configuration. Each of the wavebands in this large-band configuration is further subdivided into what is referred to as small-band configurations. These small-band configurations are assumed to have bands A, B, C, D, E, for example. Address information in small bands is mapped into a multiple wavelength pulse train to effect optical labelization. Of the small bands A, B, C, D, E, bands A to D are used for multiple wavelength labels and the remaining small band E is allocated for the transmission data signals, to thereby produce the optical packets. If a large-band label uses 8 waves, this label generation method makes it possible to ensure over 10000 labels.

Figure 3:
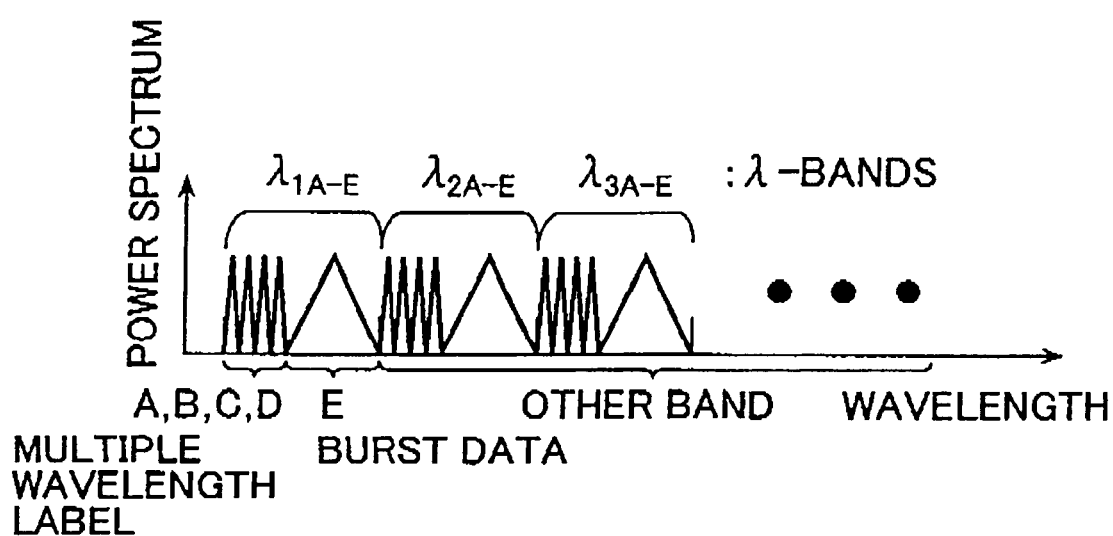
FIG. 3 shows an example of a second configuration of an optical packet having a multiple wavelength label.

FIG. 3 shows an example of a second configuration of an optical packet with a multiple wavelength label. As in the first example, these optical packets are divided into large bands $\lambda 1, \lambda 2, \ldots \lambda n$. To form optical packets, in a small-band configuration a small band is allocated to each of the optical pulses used for each optical label that has a different center wavelength from the data signals, and all of the remaining bands within a large-band member are allocated for the data signal.

Figure 4:
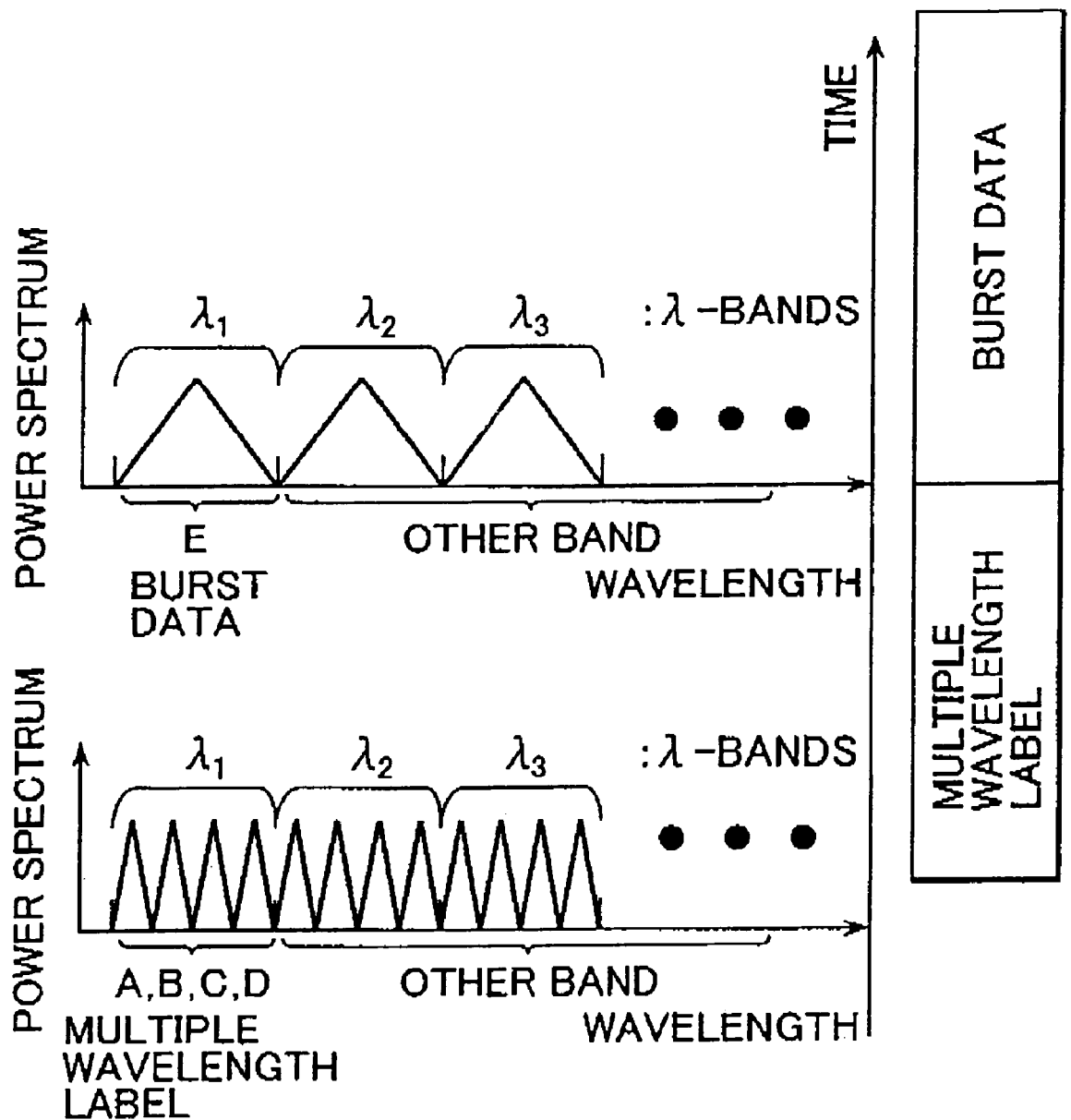
FIG. 4 shows an example of a third configuration of an optical packet having a multiple wavelength label.

FIG. 4 shows an example of a third configuration of an optical packet having a multiple wavelength label. Here, the full bandwidth of each of the bands $\lambda 1, \lambda 2, \ldots \lambda n$ is used for address information for the label. Also, data signals are generated using the full bandwidth of a large-band member. In this case, the label and data portions can be readily separated using a time gate or the like. An advantage of this configuration is that it makes it possible to easily increase the ratio of data signal to address signal.

Figure 5:
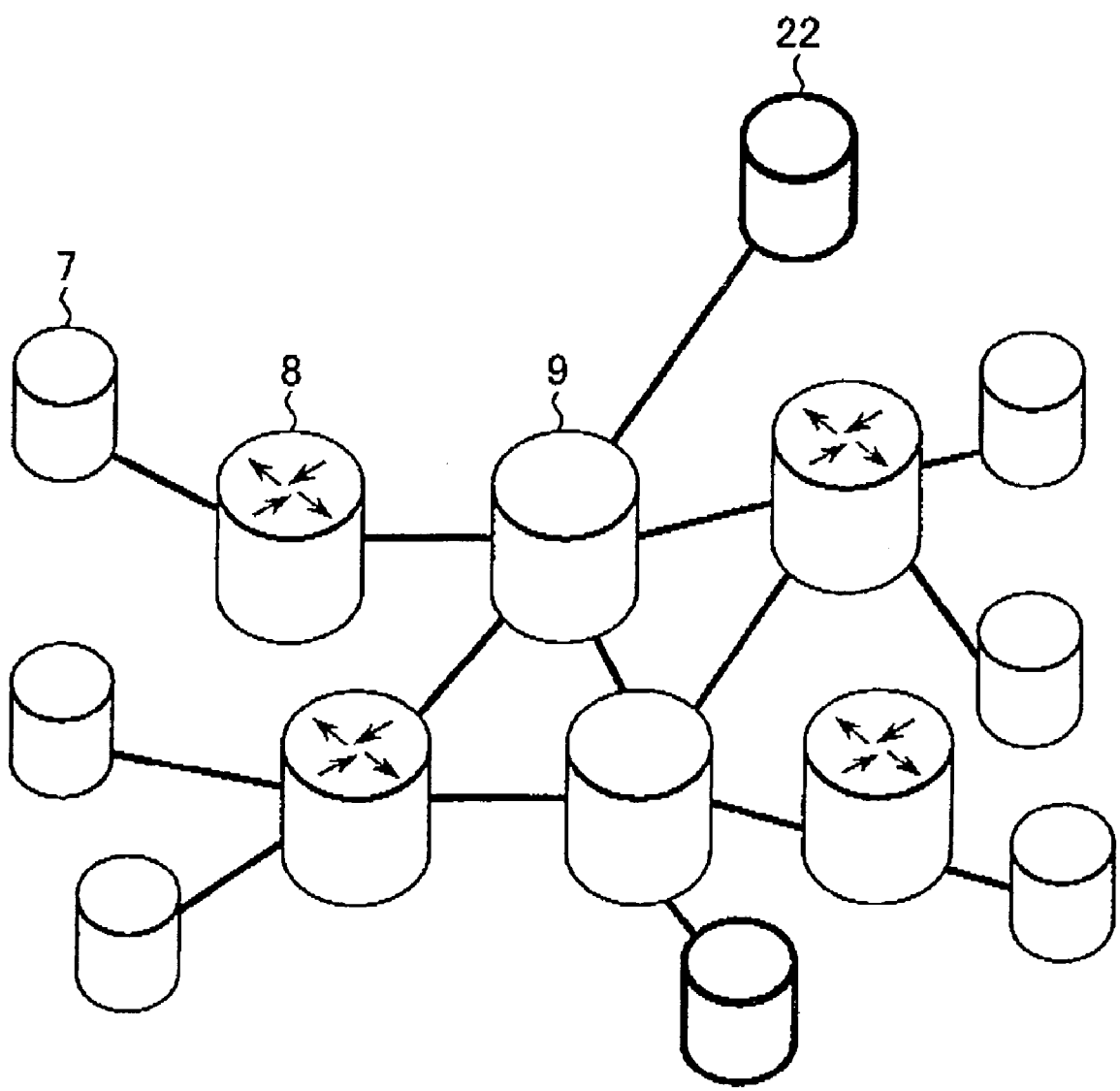
FIG. 5 shows an example of the configuration of a network that uses multiple wavelength switching routers and wavelength routers.
Figure 11:
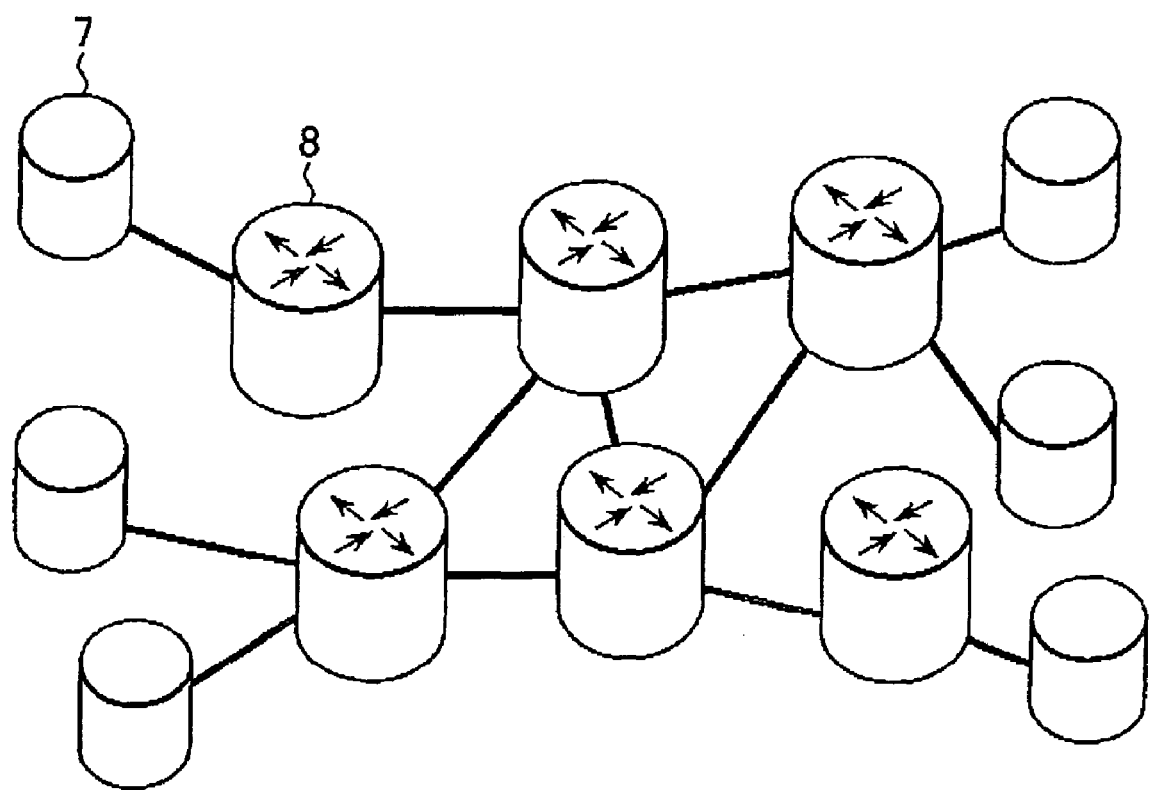
FIG. 11 shows an example of a multiple wavelength label switching router network.

FIG. 5 shows the arrangement of a network using the above multiple wavelength label switching routers. The network of FIG. 5 is configured with multiple wavelength label optical packet sender-receivers 7 connected to multiple wavelength label switching routers 8 that are linked by commercially available wavelength routers 9. A single-wavelength-packet sender-receiver 22 can also be connected to the wavelength router 9. Also, as shown in FIG. 11, a network can be formed of multiple wavelength label switching routers 8 connected together. In the packet routing method of this invention, the wavelength router 9 routes packets on a large-band configuration member basis, with the small bands within each large-band configuration member being regarded as having the same wavelength. However, the multiple wavelength label switching router 8 identifies down to the small-band configuration level in performing routing based on the multiple wavelength label processor 2 and optical switch shown in FIG. 1. This configuration can be readily merged with a photonic network that uses conventional single-wavelength routing.

Figure 6:
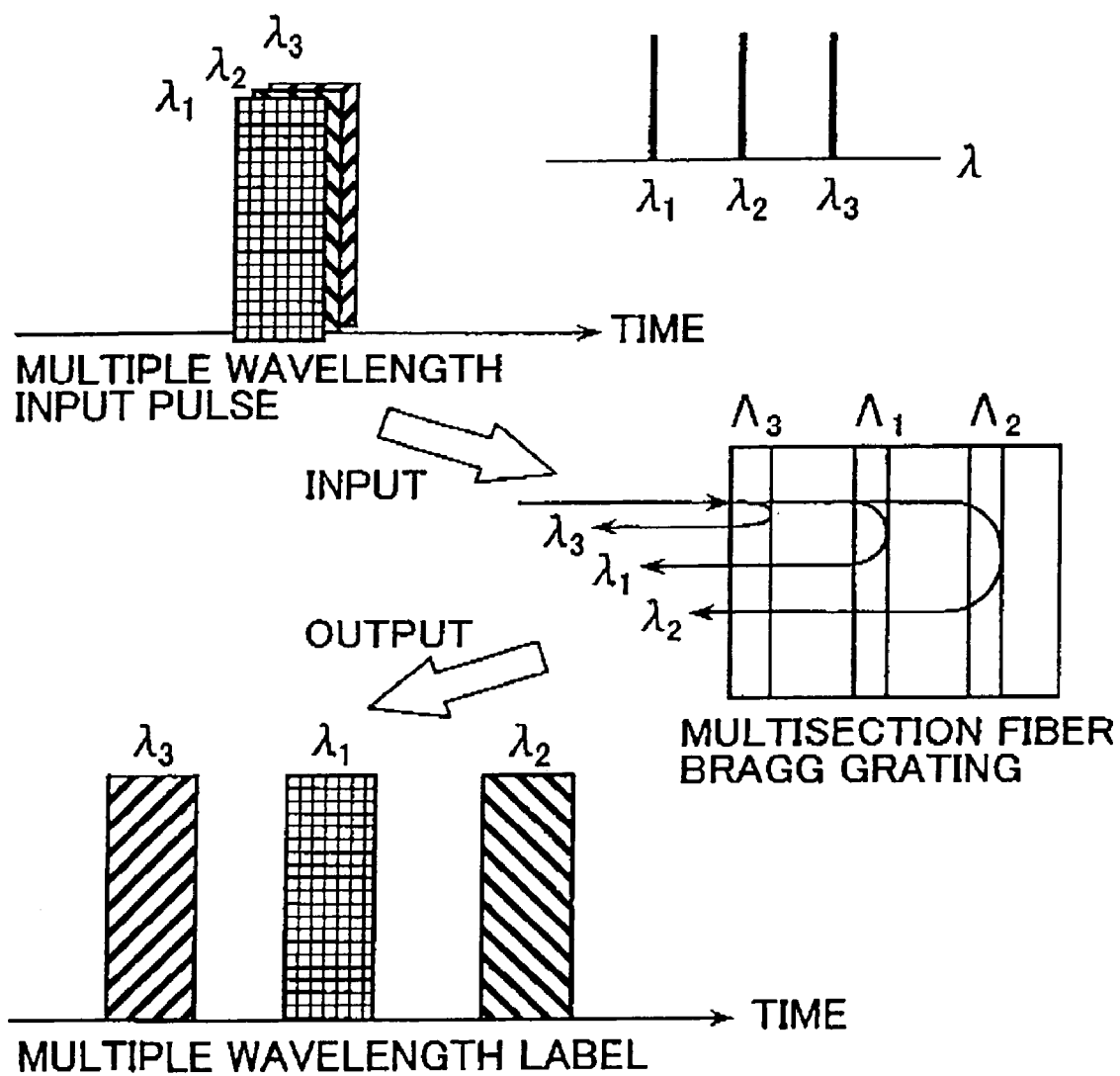
FIG. 6 illustrates a method of generating multiple wavelength labels using a multi-section fiber Bragg grating.

In the configurations described with reference to FIGS. 2, 3 and 4, when large-band members are divided into small-band members, the small-band members each have a different center wavelength. FIG. 6 shows an example of generation of multiple wavelength labels in the form of a string of optical pulses arrayed along the time axes thereof. As shown in FIG. 6, labels can be generated with a time differential by projecting multiple wavelength pulses onto a multi-section fiber Bragg grating and applying to the reflected pulse signals a time delay that differs in accordance with the wavelength.

Figure 7:
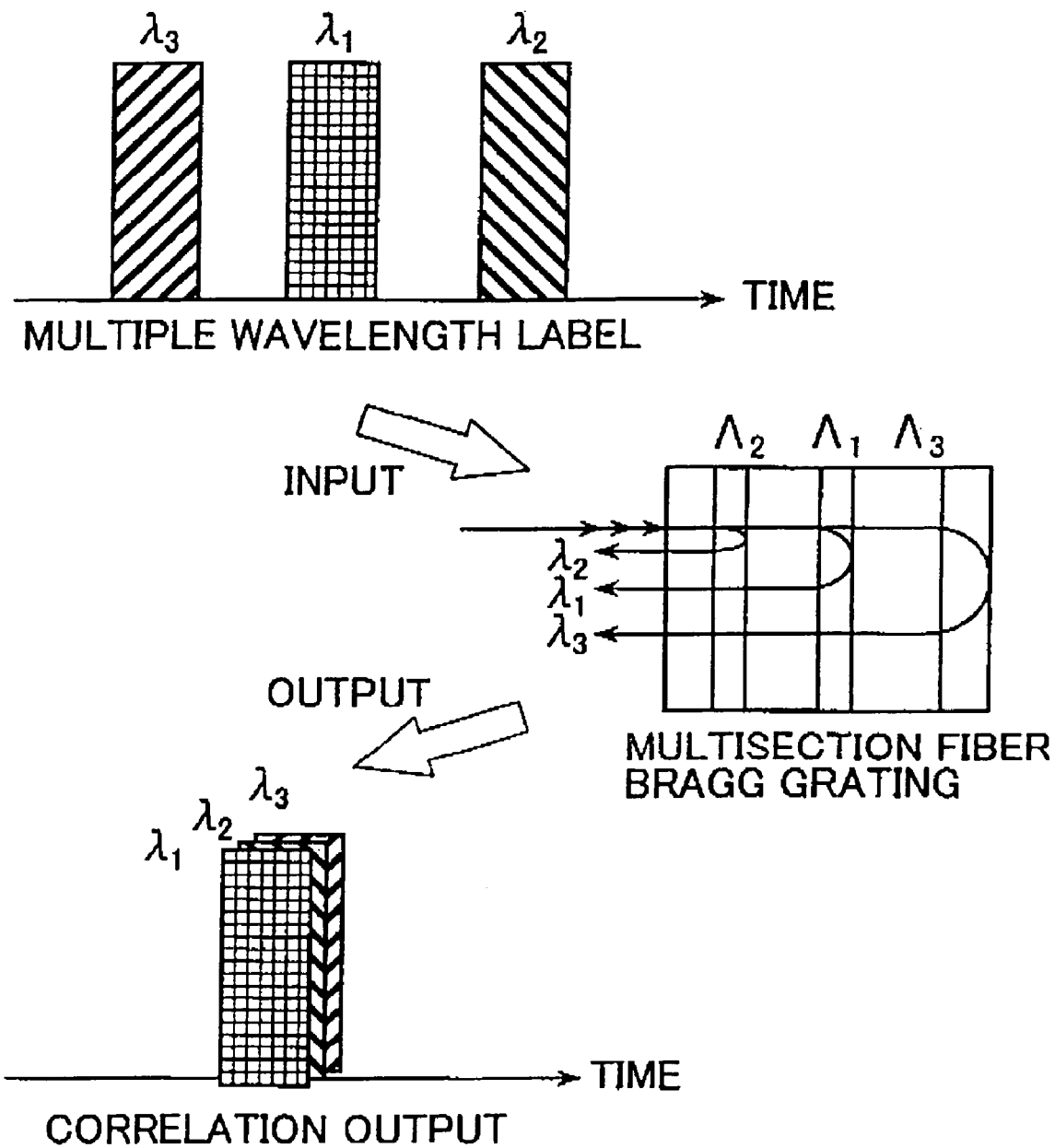
FIG. 7 illustrates a method of matching multiple wavelength labels using a multi-section fiber Bragg grating.

FIG. 7 shows a multiple wavelength label discriminator based on a multi-section fiber Bragg grating. The multi-section fiber Bragg grating shown in FIG. 6 has a configuration that is inverted with respect to the direction of light incidence. When specified multiple wavelength labels fall incident on this label discriminator, the reflected signals are adjusted to compensate for the time delay received by each pulse during label generation, to thereby reproduce the original multiple wavelength pulses. When the label discriminator finds that the combined characteristic (wavelength and time-position) of a reflected band does not match that of an incident label, no compensation is effected for the time delay received at the time the label was generated, so the original pulses are not reproduced. Thus, it becomes possible to distinguish between matching and non-matching labels by subjecting the output of the label discriminator to threshold processing. The multiple wavelength label processor shown in FIG. 1 can be configured with an array of multi-section fiber Bragg grating based label discriminators. Optical packets that simultaneously fall incident on the array can then be simultaneously processed using a routing table and packet labels to assign predetermined routes and labels.

Figure 8:
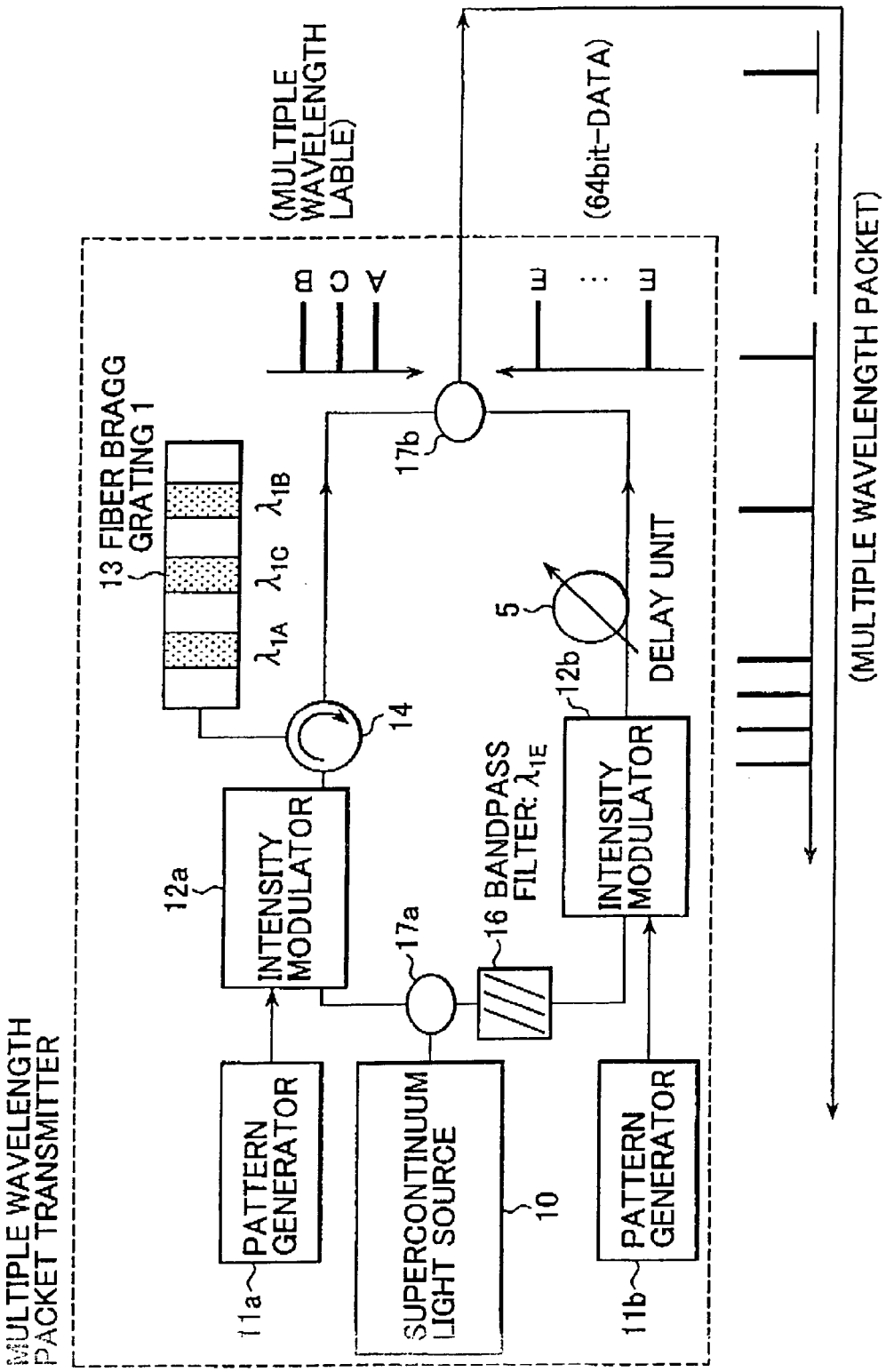
FIG. 8 is a block diagram of a multiple wavelength packet transmitter that transmits optical packet signals having multiple wavelength labels.

FIG. 8 is a block diagram of a multiple wavelength packet transmitter that transmits optical packet signals having multiple wavelength labels. In FIG. 8, a supercontinuum light source 10 denotes a multiple wavelength light source with a center wavelength of 1.56 μm. This light source produces light pulses with a broad wavelength distribution. The light pulses emitted by the light source 10 pass through an optical coupler 17a and a bandpass filter 16 with a 5-nm bandpass characteristic. Light pulses transmitted by the bandpass filter 16 form a small-band member constituting a data signal, and light pulses that are not transmitted by the bandpass filter 16 form a group of small-band members constituting a multiple wavelength label. By means of an intensity modulator 12b, the optical signals passed by the filter 16 are intensity-modulated by a 10-Gbps electrical signal generated by a pattern generator 11b and time-adjusted by the optical delay unit 5 to form burst data. Light that does not go to the filter 16 is intensity-modulated by an intensity modulator 12a, using a 10-Gbps electrical signal generated by a pattern generator 11a, and is input to a multi-section fiber Bragg grating 13 connected to the light path by a circulator 14, to thereby form a multiple wavelength label. The burst data and multiple wavelength label are combined by an optical coupler 17b and output as an optical packet.

Figure 9:
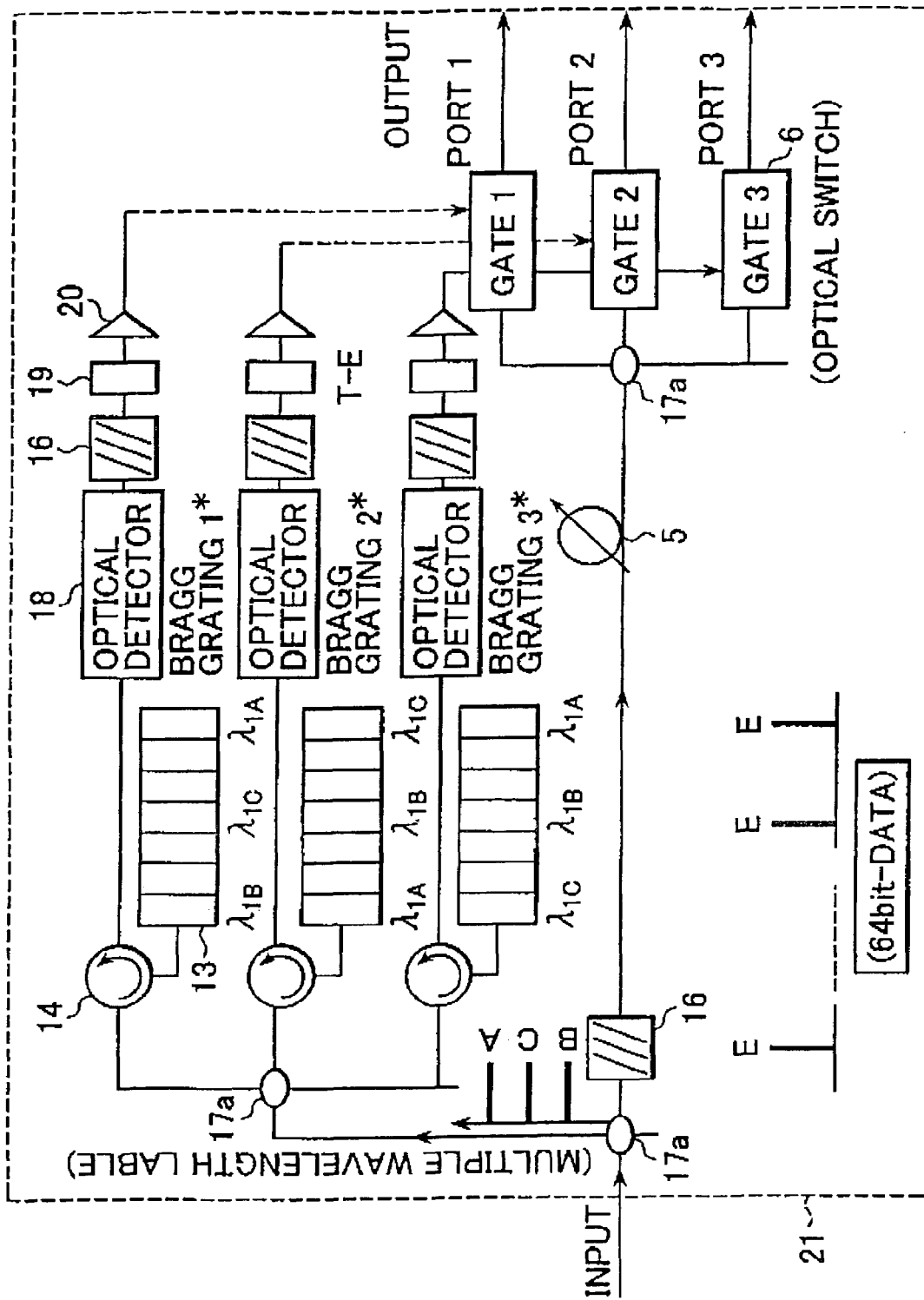
FIG. 9 is a block diagram of part of a multiple wavelength label switching router that uses an array of multi-section fiber Bragg gratings to process the multiple wavelength labels.

FIG. 9 is a block diagram of a part 21 of a multiple wavelength label switching router that uses an array of three multi-section fiber Bragg gratings 13, each having a different characteristic, to process the multiple wavelength labels. Optical packets having multiple wavelength labels that are input to the router are divided by an optical coupler 17a into a label portion that does not pass through the bandpass filter 16, and a data portion that does not go to the bandpass filter 16. The light is divided into a plurality of beams by the optical coupler 17a, with each beam going via a circulator 14 to fall incident on a multi-section fiber Bragg grating 13. Label matching is performed using the multi-section fiber Bragg grating system shown in FIG. 7. When there is a label match, the label discriminator outputs a switch operation control signal that opens a specific gate switch, allowing the emission of data-section signals from a selected port.

FIG. 10 shows the waveforms of signals from the multiple wavelength packet transmitter of FIG. 8 that are input to the router shown in FIG. 9. FIG. 10(a) shows the signal waveform of a multiple wavelength label generated by means of a multi-section fiber Bragg grating; FIG. 10(b) shows the signal waveform of the packet consisting of a header having a multiple wavelength label and a payload data; FIG. 10(c) shows the waveform of a signal signifying a label match output by a multiple wavelength label matching unit comprised of a multi-section fiber Bragg grating; FIG. 10(d) shows the waveform of a signal signifying a label non-match output by a multiple wavelength label matching unit comprised of a multi-section fiber Bragg grating; FIG. 10(e) shows the waveform of a signal output by a three-port switch signifying a port 41 multiple wavelength label; and FIG. 10(f) shows the waveform of a signal output by a three-port switch signifying a port #3 multiple wavelength label. This method of the present invention for routing optical packets using multiple wavelength labels, enables problem-free routing of optical signals.

The invention having the configurations described in the foregoing embodiments and aspects provides the following effects. It readily enables routing to be carried out in an optical packet communication system, using labels comprised of multiple wavelength optical pulses. The fact that optical pulses in a two-dimensional space defined by wavelength and time axes are used as the basic address signals greatly increases the number of labels that can be used for routing purposes. Moreover, these address signals can be readily generated by means of a simple configuration that uses multi-section fiber Bragg gratings, facilitating the generation of packet routing labels and the routing itself. The optical packet router of the invention can also be used in conjunction with a conventional packet routing system that switches paths based on wavelength differences. Networks can also be configured with optical packet routers of the invention connected together.

What is claimed is:

1. An optical packet communication network that uses each of multiple wavelength labels, said network comprising:
  at least one multi-wavelength label-switching router to convert optical packet address signals to a plurality of optical pulses including first address information that is identified by wavelength information delimited by a first waveband width, and second address information that is identified by wavelength information delimited by a second waveband width and predetermined time differential information, to effect optical labelization by mapping address information into a multiple wavelength pulse train in small-band configurations which each of wavebands on a large-band configuration member basis is subdivided into and to perform packet routing based on the optical labelization; and
  at least one router configured to switch optical paths in accordance with differences in combinations of multiple optical pulse wavelengths and time differentials included in the address signals, and connected to said switching router.

2. An optical packet communication network that uses each of multiple wavelength labels, said network comprising:
  a multiple wavelength packet transmitter to convert optical packet address signals to a plurality of optical pulses including first address information that is identified by wavelength information delimited by a first waveband width, and second address information that is identified by wavelength information delimited by a second waveband width and predetermined time differential information;
  a first router configured to switch optical paths in accordance with differences in wavelengths of multiple optical pulses included in address signals, based on the first address information; and
  a second router configured to switch optical paths in accordance with differences in combinations of multiple optical pulse wavelengths and time differentials included in address signals, based on the second address information, with the second router being connected to the first router.

* * * * *